United States Patent
Cho et al.

(10) Patent No.: US 6,997,562 B2
(45) Date of Patent: Feb. 14, 2006

(54) SCROLLING UNIT AND PROJECTION SYSTEM USING THE SAME

(75) Inventors: Kun-ho Cho, Suwon-si (KR); Dae-sik Kim, Suwon-si (KR); Sang-chul Kwon, McLean, VA (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 10/809,819

(22) Filed: Mar. 26, 2004

(65) Prior Publication Data

US 2004/0257387 A1   Dec. 23, 2004

Related U.S. Application Data

(60) Provisional application No. 60/457,312, filed on Mar. 26, 2003.

(30) Foreign Application Priority Data

May 24, 2003   (KR) ...................... 10-2003-0033242

(51) Int. Cl.
*G03B 21/00* (2006.01)
*G03B 21/26* (2006.01)
*G03B 26/08* (2006.01)

(52) U.S. Cl. ........................... 353/32; 353/34; 353/37; 359/210

(58) Field of Classification Search ................. 353/31, 353/32, 34, 37, 84; 359/196, 209, 210, 213; 348/742–743, 771

See application file for complete search history.

(56) References Cited

U.S. PATENT DOCUMENTS

| | | | |
|---|---|---|---|
| 6,288,815 B1 * | 9/2001 | Lambert ..................... | 359/196 |
| 6,332,684 B1 * | 12/2001 | Shibatani et al. ............. | 353/31 |
| 6,619,802 B1 * | 9/2003 | Janssen et al. ................ | 353/31 |
| 2002/0191154 A1 | 12/2002 | Shahzad et al. | |

FOREIGN PATENT DOCUMENTS

| | | |
|---|---|---|
| JP | 11-281930 A | 10/1999 |
| KR | 1999-002347 A | 1/1999 |

* cited by examiner

*Primary Examiner*—Christopher Mahoney
(74) *Attorney, Agent, or Firm*—Sughrue Mion, PLLC

(57) ABSTRACT

A scrolling unit and a projection system using the same are provided. The scrolling unit is formed by spirally arranging on an outer circumferential surface of a column-like plate at least one lens cell which separates the incident light into a plurality of beams. As the scrolling unit rotates about a predetermined rotating axis, a lens array, defined by an area of the scrolling unit through which light passes, moves rectilinearly. Due to the use of the scrolling unit, a simple projection system can be obtained, and color scrolling is easily performed.

26 Claims, 16 Drawing Sheets

SCROLLING UNIT AND PROJECTION SYSTEM USING THE SAME

This application claims the priority of Korean Patent Application No. 2003-33242, filed on May 24, 2003, in the Korean Intellectual Property Office, and the benefit of U.S. Patent Provisional Application No. 60/457,312, filed on Mar. 26, 2003, in U.S. Patent and Trademark Office, the disclosures of which are incorporated herein in their entirety by reference.

BACKGROUND OF THE INVENTION

1. Field of the Invention

An apparatus consistent with the present invention relates to a scrolling unit and a projection system which forms a color image using the scrolling unit and, more particularly, to an endless track-like color scrolling unit which is installed on a single light path to handle all plural color beams and which can perform color scrolling upon rotation, and a projection system using the color scrolling unit.

2. Description of the Related Art

Projection systems are classified into either 3-panel projection systems or single-panel projection systems according to the number of light valves that are used. The light valves control the on/off operation of light emitted from a high-output lamp, used as a light source, on a pixel-by-pixel basis and thus, forming a picture. Single-panel projection systems can have a smaller optical system than the three-panel projection systems. However, these single-panel projection systems provide only ⅓ of the optical efficiency of the three-panel projection systems because red (R), green (G), and blue (B) colors into which white light is separated are used sequentially. Hence, attempts to increase the optical efficiency of single-panel projection systems have been made.

Generally, in a single-panel projection system, light radiated from a white light source is separated into R, G, and B color beams using color filters, and the three color beams are sequentially transmitted to a light valve. The light valve operates according to the sequence of color beams received and creates images. As described above, a single-panel projection system uses color beams sequentially, therefore, the light efficiency is reduced to ⅓ of the light efficiency of a three-panel projection system. According to one color scrolling method designed to increase the optical efficiency of a single-panel projection system, white light is separated into R, G, and B color beams, and the three color beams are simultaneously sent to different locations on a light valve. Since an image cannot be produced until all of the R, G, and B color beams for each pixel reach the light valve, the color beams are moved at a constant speed using the color scrolling method.

In a single-panel scrolling projection system, as shown in FIG. 1, white light emitted from a light source 100 passes through first and second lens arrays 102 and 104, and a polarization conversion system (PCS) 105, and is separated into R, G, and B color beams by first through fourth dichroic filters 109, 112, 139, and 122. More specifically, the red beam R and the green beam G, for example, are transmitted by the first dichroic filter 109 and advance along a first light path $L_1$, while the blue beam B is reflected by the first dichroic filter 109 and travels along a second light path $L_2$. The red beam R and the green beam G on the first light path $L_1$ are separated by the second dichroic filter 112. The second dichroic filter 112 transmits the red beam R along the first light path $L_1$ and reflects the green beam G along a third light path $L_3$.

First through third prisms 114, 135 and 142 are disposed in the first through third light paths $L_1$, $L_2$, and $L_3$, respectively. The light emitted from the light source 100 is separated into the R, B, and G beams, and they are then scrolled while passing through corresponding first through third prisms 114, 135, and 142. The first through third prisms 114, 135, and 142 rotate at a uniform speed such that R, B, and G color bars are scrolled. The B and G beams that travel along the second and third light paths $L_2$ and $L_3$, respectively, are transmitted and reflected by the third dichroic filter 139, respectively, and then combined. Finally, the R, G, and B beams are combined by the fourth dichroic filter 122. The combined beam is transmitted to a light valve 130 via a polarization beam splitter (PBS) 127. The light valve 130 forms a picture.

A condensing lens 107 is disposed next to the PCS 105, and light path correction lenses 110, 117, 131, 137, and 145 are disposed along the first through third light paths $L_1$, $L_2$, and $L_3$. Condensing lenses 120 and 140 are disposed between the second and fourth dichroic filters 112 and 122 and between the third and fourth dichroic filters 139 and 122, respectively. A focusing lens 124 and a polarizer 125 are disposed in the light path between the fourth dichroic filter 122 and the PBS 127. Light path changers, for example, mirrors 118 and 133, are disposed in the first and second light paths $L_1$ and $L_2$, respectively.

The periodic scrolling of the R, B, and G color bars due to rotation of the first through third prisms 114, 135, and 142 is illustrated in FIG. 2. Scrolling represents the movement of color bars formed on the surface of the light valve 130 when the first, second, and third prisms 114, 135, and 142 corresponding to R, B, and G colors are synchronously rotated. As described above, when R, G, and B color bars circulate one time, one frame of a color image is formed.

A color image obtained by turning on or off the individual pixels of the light valve 130 on or off according to an image signal is magnified by a projection lens (not shown) and projected onto a screen.

First, second, and third slits 113, 134, and 143 are disposed in front of the first, second, and third prisms 114, 135, and 142, respectively, and control the divergence angle of incident light. The widths of the color bars vary according to the widths of the first, second, and third slits 113, 134, and 143. If the slit widths decrease, the R, G, and B color bars are narrowed such that black bars K are formed between adjacent color bars as illustrated in FIG. 3A. On the other hand, if the slit widths increase, the R, G, and B color bars are enlarged such that overlapping portions P are formed between adjacent color bars as illustrated in FIG. 3B.

Since the conventional projection system uses different light paths for each color as described above, a light path correction lens must be included for each of the colors, components for unifying the separated light beams must be further included, and separate components must be included for each color. Hence, the conventional optical system is bulky, and the manufacturing and assembly thereof is complicated, thus degrading the yield. In addition, three motors (not shown) for rotating the first, second, and third prisms 114, 135, and 142 generate a lot of noise during operation. Thus, the projection system adopting three motors is manufactured at a greater cost than a color wheel type projection system which utilizes a single motor.

In order to produce a color picture using a scrolling technique, color bars as shown in FIG. 2 must be moved at a constant speed. Hence, the conventional projection system must synchronize the light valve 130 with the three prisms 114, 135, and 142 in order to achieve proper scrolling. However, controlling the synchronization is not easy. Further, due to the individual circular motions of the first, second, and third prisms 114, 135, and 142, the color scrolling speed by the three scrolling prisms is irregular, consequently deteriorating the quality of the resultant image.

SUMMARY OF THE INVENTION

An apparatus consistent with the present invention provides a scrolling unit in a compact projection system which is formed by spirally arranging at least one cylindrical lens cell on an outer circumferential surface of a column-like plate and installed on a single light path so that color scrolling is achieved.

According to an aspect of the present invention, there is provided a scrolling unit for scrolling incident light in which at least one lens cell, which separates the incident light into a plurality of beams, is spirally arranged on an outer circumferential surface of a column-like plate. A rotation of the scrolling unit about a predetermined rotating axis simulates a rectilinear motion of a lens array defined by an area of the scrolling unit through which light passes.

The column-like plate may be of a drum shape.

A flat light guide plate or a curved light guide plate may be installed within the scrolling unit.

According to another aspect of the present invention, there is provided a projection system comprising: a light source; a color separator which separates light emitted from the light source according to color; a scrolling unit which is formed by spirally arranging at least one lens cell on an outer circumferential surface of a column-like plate and which scrolls incident light upon rotation which simulates a rectilinear motion of a lens array defined by an area of the scrolling unit through which light passes; and a light valve on which a plurality of color beams obtained by the color separator are incident via the scrolling unit and which processes the color beams according to an input image signal to form a color image.

The color separator may include first, second, and third dichroic filters inclined adjacent to one another at different angles and transmitting or reflecting the incident light according to color, and the scrolling unit is disposed behind the color separator.

The color separator may include first, second, and third dichroic filters inclined adjacent and parallel to one another and transmitting or reflecting the incident light according to color, and the scrolling unit is disposed in front of the color separator.

First and second fly-eye lens arrays are disposed on a light path between the color separator and the light valve.

A first cylindrical lens for reducing the width of a light beam incident upon the scrolling unit is disposed in front of the scrolling unit, and a second cylindrical lens for collimating a light beam transmitted through the scrolling unit is disposed behind the scrolling unit.

According to another aspect of the present invention, there is also provided a projection system comprising: a light source; a color separator which separates light emitted from the light source according to color; a scrolling unit which is formed by spirally arranging at least one lens cell on an outer circumferential surface of a column-like plate and which scrolls incident light upon rotation which simulates a rectilinear motion of a lens array defined by an area of the scrolling unit through which light passes; a light guide plate which is disposed within the scrolling unit and guides light transmitted through the scrolling unit; and a light valve on which a plurality of color beams obtained by the color separator are incident via the scrolling unit and the light guide plate and which processes the color beams according to an input image signal to form a color image.

First and second cylinder lens arrays have a plurality of cylinder lens cells arranged parallel to one another and are disposed on a light path between the color separator and the light valve.

A direction in which the light guide plate guides light incident upon the scrolling unit may be perpendicular to a direction in which the cylinder lens cells are arranged.

A spatial filter for controlling the divergence angle of light emitted from the light source is disposed in a light path between the light source and the color separator.

The lens cells may be arranged at an identical inclination on the outer circumferential surface of the column-like plate.

A color scrolling speed may depend on a width of a lens cell and the inclination of the lens cell.

BRIEF DESCRIPTION OF THE DRAWINGS

The above and other features and advantages of the present invention will be readily apparent by describing, in detail, exemplary embodiments thereof with reference to the accompanying drawings in which.

DETAILED DESCRIPTION OF ILLUSTRATIVE, NON-LIMITING EMBODIMENTS OF THE INVENTION

Figure 1:
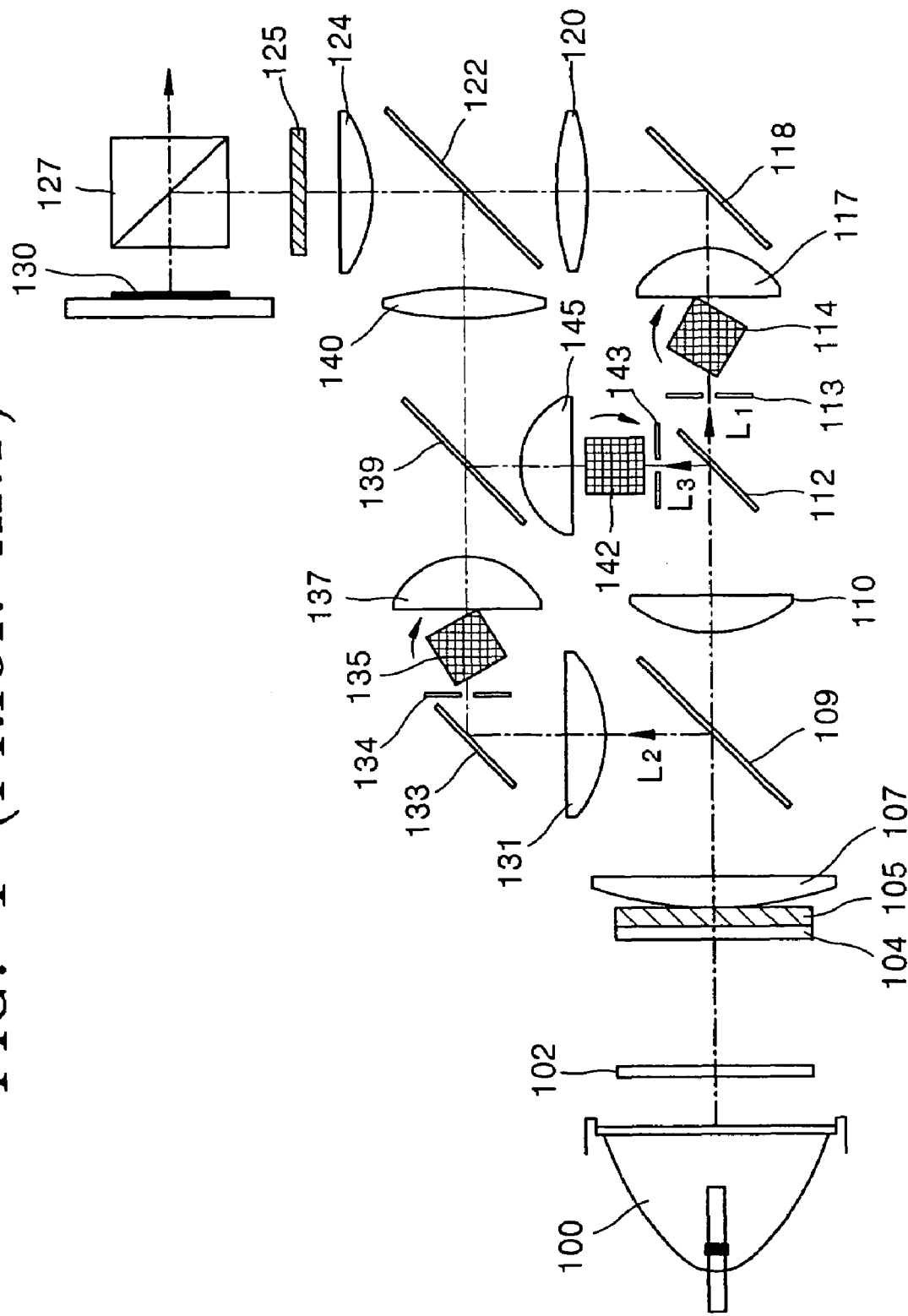
FIG. 1 is a schematic diagram of a conventional projection system.
Figure 2:
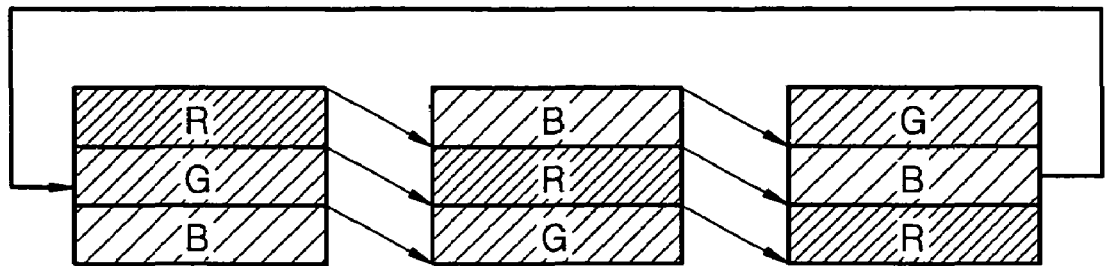
FIG. 2 is an illustration of R, G, and B color bars according to a conventional projection system.
Figure 3A:
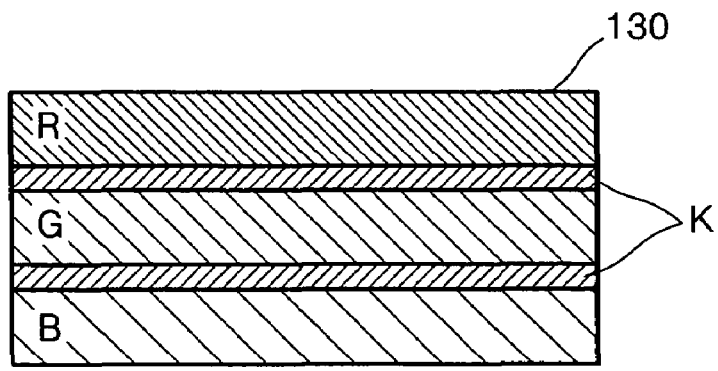
FIGS. 3A and 3B show color bars produced on a light valve used in a projection system for forming a color image using a scrolling technique.
Figure 3B:
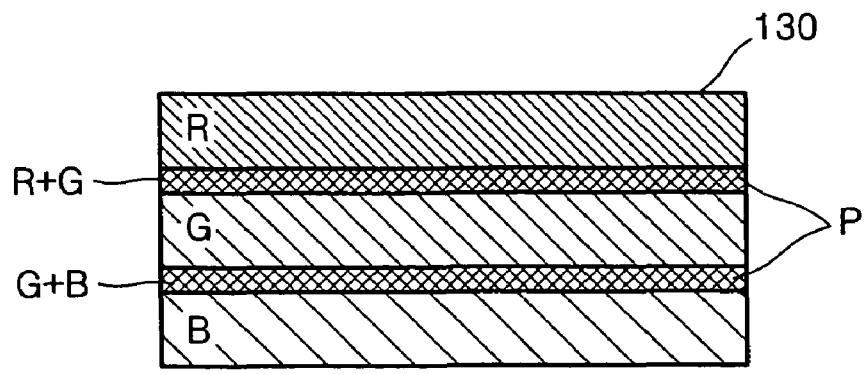
Figure 4:
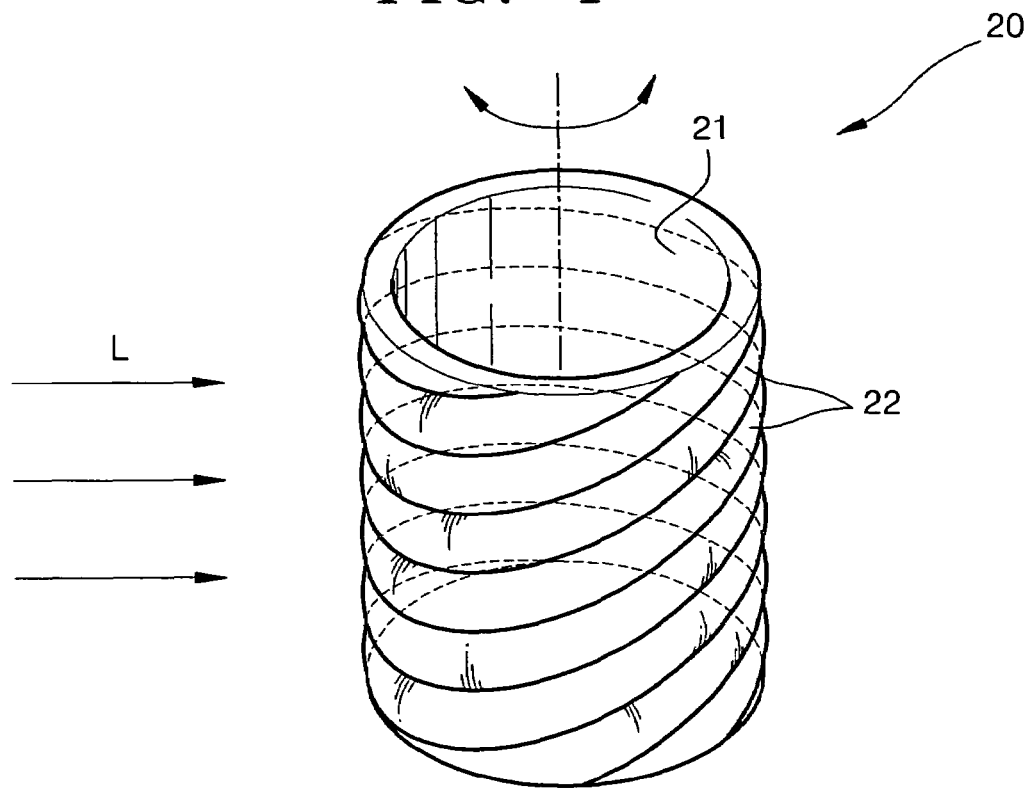
FIG. 4 is a perspective view of a scrolling unit according to an embodiment of the present invention.

Referring to FIG. 4, a scrolling unit 20 according to an embodiment of the present invention is formed by spirally arranging at least one lens cell 22 on an outer circumferential surface of a column-like plate 21. Preferably, but not necessarily, the lens cells 22 are cylinder lens cells. The column-like plate 21 may be of a drum shape or various polyprism shapes.

Figure 5A:
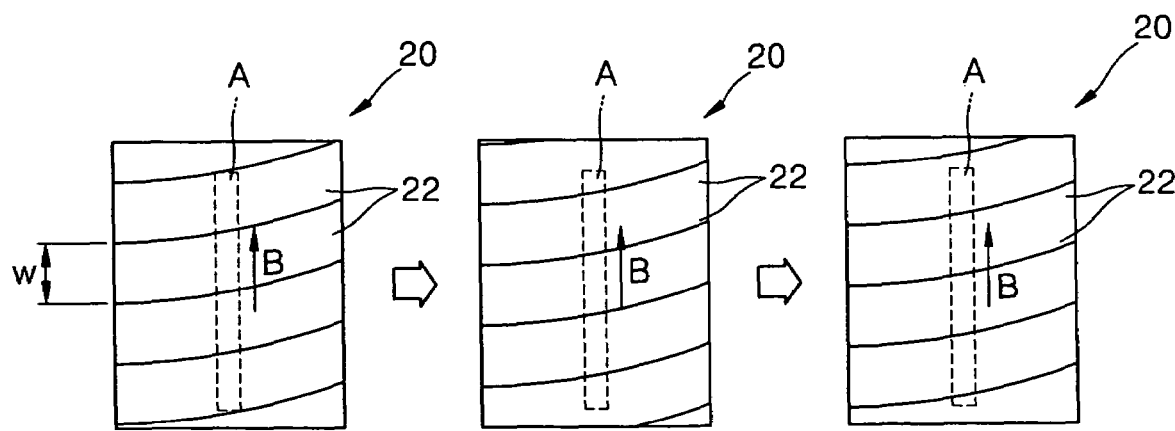
FIGS. 5A and 5B are illustrations of the scrolling unit of FIG. 4 to explain a scrolling operation achieved with a rotation of the scrolling unit of FIG. 4.
Figure 5B:
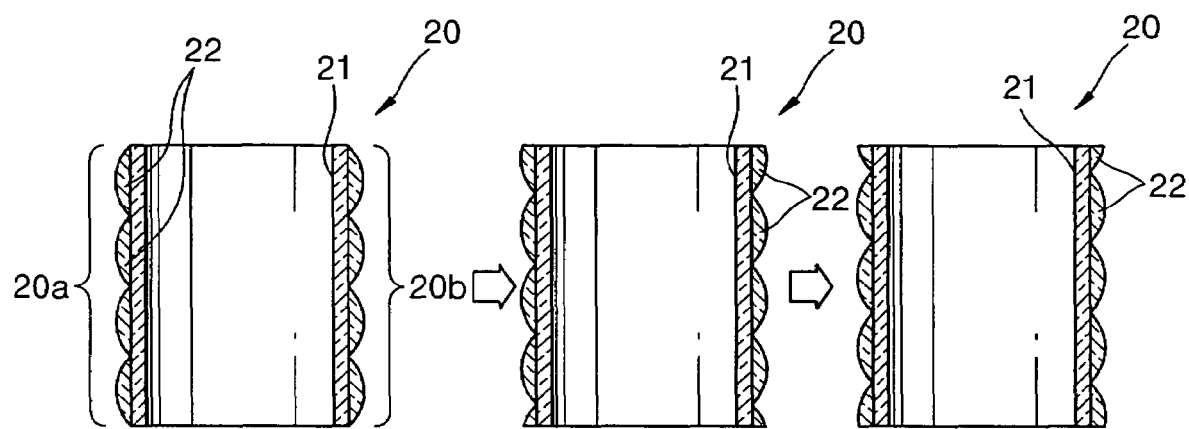

FIG. 5A is a side view of the scrolling unit 20, and FIG. 5B is a cross-section of an area of the scrolling unit 20 through which light L passes. The cross-section of the area of the scrolling unit 20 through which light L passes is shown as a cylinder lens array.

The scrolling unit 20 is rotatable. As shown in FIG. 5A, the rotation of the scrolling unit 20 simulates a rectilinear motion (which is in direction indicated by arrow B) of the cylinder lens cells 22 as viewed from an area A through which the light L passes. FIGS. 5A and 5B illustrate a process in which as viewed from light passing through the scrolling unit 20 which rotates, lens cells 22 defined by the area A of the scrolling unit 20 through which light L passes move rectilinearly upward and downward.

Although the scrolling unit 20 is formed by spirally arranging the cylinder lens cells 22, the area A, having a relatively narrow width, appears as an array of the cylinder lens cells 22, that is, a cylinder lens array. As the scrolling unit 20 rotates, the positions of lens cells 22 through which light passes are consecutively and periodically changed. The cylinder lens array move rectilinearly at intervals of a cross-section width (w) of a lens cell 22. Preferably, but not necessarily, the lens cells 22 are arranged on the outer circumferential surface of the column-like plate 21 at an identical inclination so that the cylinder lens array can periodically move with a rotation of the scrolling unit 20. The interval of the rectilinear motion of the cylinder lens array depends on the width (w) and inclination of each of the lens cells 22.

As shown in FIG. 5B, the scrolling unit 20 has a first surface 20a, through which the light L enters, and a second surface 20b, through which the light L goes out. Accordingly, the scrolling unit 20 can provide an effect where light passes through two lens arrays. While light is passing through the first surface 20a, it is divided into a plurality of beams by each of the lens cells 22. A plurality of optical spots are formed on the second surface 20b. The plural beams are scrolled by a rectilinear motion of the cylinder lens array occurring upon rotation of the scrolling unit 20.

As the scrolling unit 20 rotates, the cylinder lens array defined by the area A, through which light passes, gradually moves upward or downward. As the cylinder lens array moves, the paths of the beams passing through the cylinder lens array are changed. This motion of the cylinder lens array is made at intervals of a width (w) of each of the lens cells 22. As long as the scrolling unit 20 rotates in an identical direction, the cylinder lens array continuously moves in one direction without changing the direction.

Figure 6A:
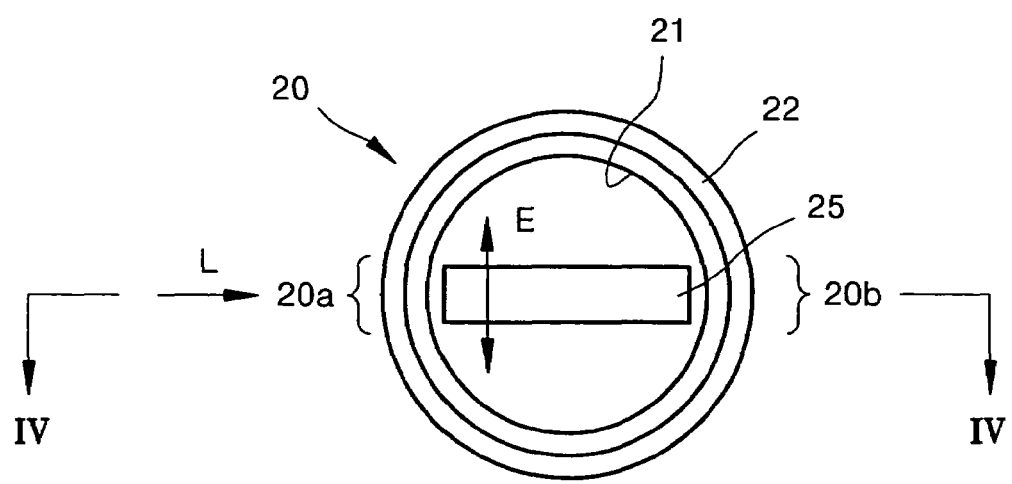
FIG. 6A is a top view of the scrolling unit of FIG. 4, in which a light guide plate is disposed.
Figure 6B:
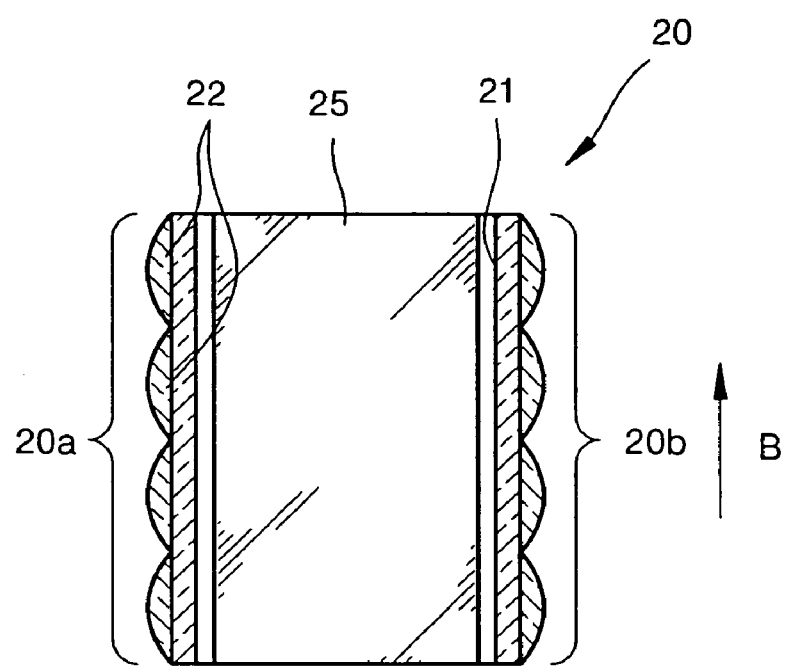
FIG. 6B is a cross-section of FIG. 6A taken along line IV—IV.

Preferably, but not necessarily, a light guide plate 25 is further installed between the first and second surfaces 20a and 20b of the scrolling unit 20 as shown in FIGS. 6A and 6B. The light guide plate 25 guides light passed through the first surface 20a so that light is uniformly distributed in direction E. Preferably, but not necessarily, the light guide plate 25 guides the light L in a direction perpendicular to the direction E of the rectilinear motion of the cylinder lens array of the scrolling unit 20 and to the direction in which light advances.

Figure 7:
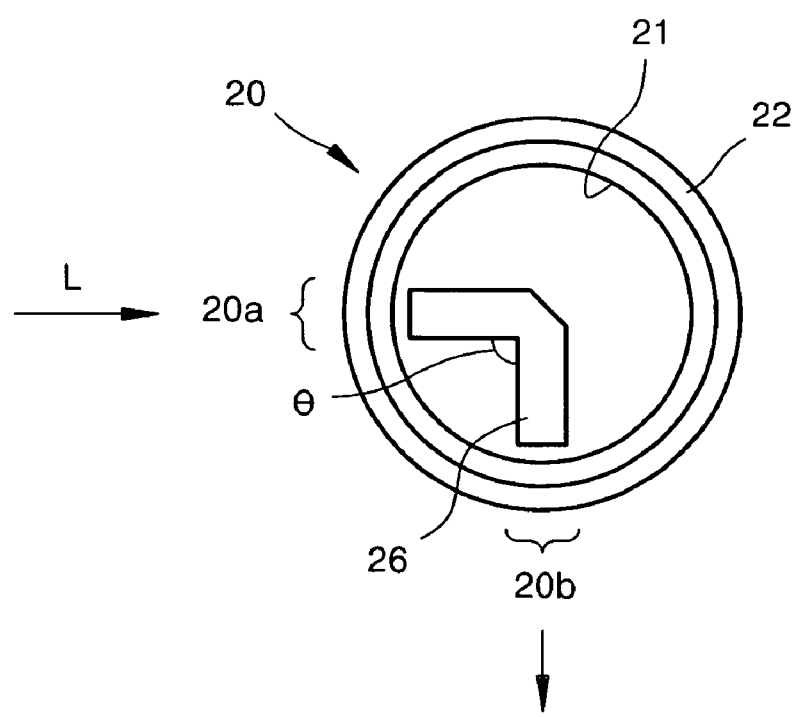
FIG. 7 is a top view of the scrolling unit of FIG. 4, in which a light path changer is disposed.

Alternatively, a light path changer 26 may be disposed within the scrolling unit 20 as shown in FIG. 7. The light path changer 26 may be a light guide plate curved at a predetermined angle ($\theta$). Alternatively, the light path changer 26 may be a mirror which is inclined at a predetermined angle with respect to the incident light axis. Since the light path changer 26 is curved at the predetermined angle ($\theta$), an area of the scrolling unit 20 through which light goes out can be changed.

A functional effect of the light guide plate 25 or the light path changer 26 will be described later in association with a projection system.

Figure 8A:
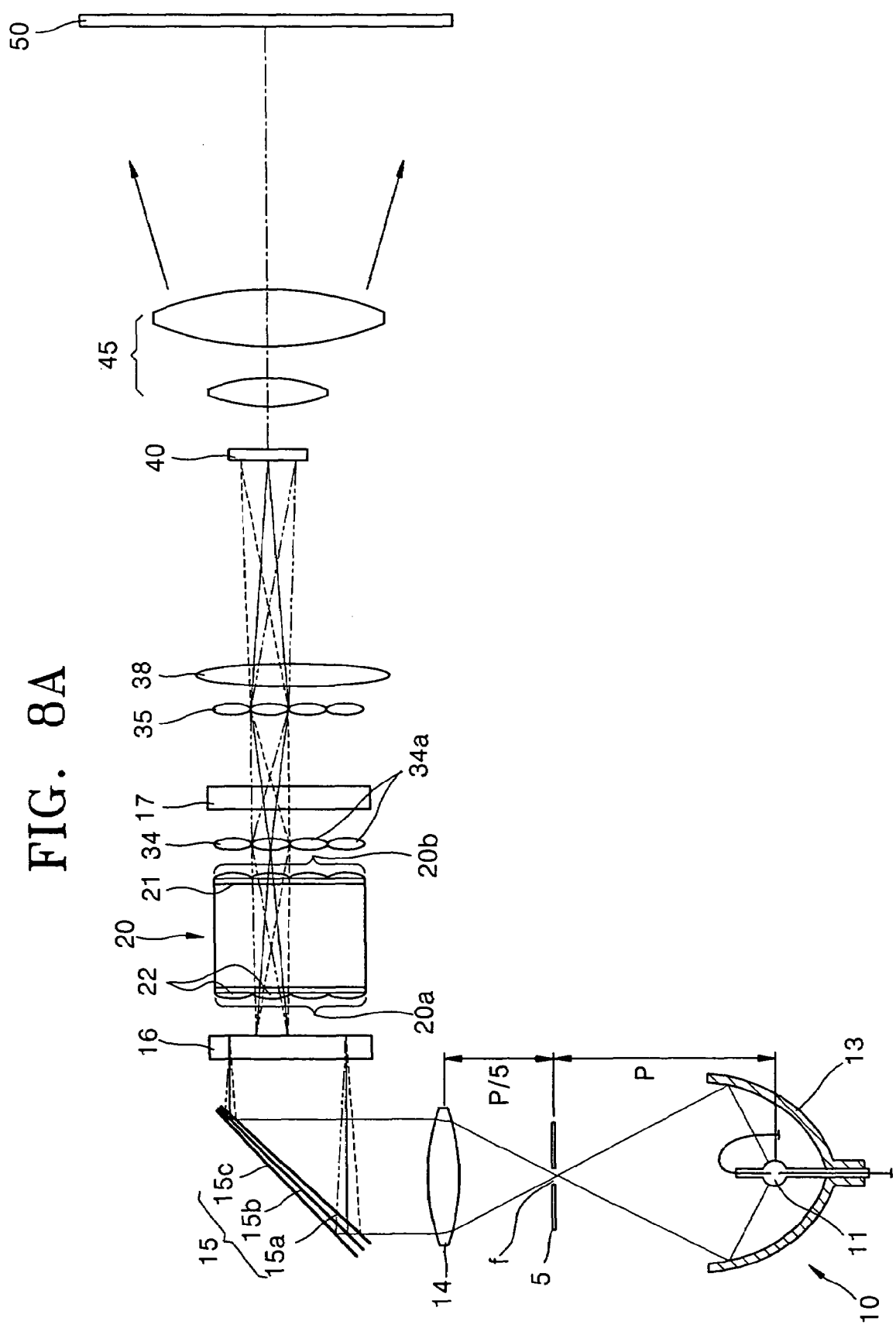
FIG. 8A is a schematic diagram of a projection system according to an embodiment of the present invention.

Referring to FIG. 8A, a projection system according to an embodiment of the present invention includes a light source 10, a color separator 15, a scrolling unit 20, a light valve 40, and a projection lens unit 45. The color separator 15 separates light emitted from the light source 10 according to color. The scrolling unit 20 scrolls a plurality of color beams. The light valve 40 processes the beams transmitted by the scrolling unit 20 according to an image signal and forms a picture. The projection lens unit 45 magnifies the picture formed by the light valve 40 and projects the magnified picture onto a screen 50.

The light source 10 emits white light and includes a lamp 11, for generating light, and a reflection mirror 13, for reflecting light emitted from the lamp 11 and for guiding the path of the reflected light. The reflection mirror 13 may be an elliptical mirror whose first focal point is the position of the lamp 11 and whose second focal point is a point where light is focused. Alternatively, the reflection mirror 13 may be a parabolic mirror which uses the lamp 11 as a focal point and which collimates light beams emitted from the lamp 11. If a parabolic mirror is used as the reflection mirror 13, a lens for focusing light may also be included.

A collimating lens 14 for collimating incident light is installed in a light path between the light source 10 and the color separator 15. P denotes the distance between the light source 10 and a focal point (f) where light emitted from the light source 10 is focused. The collimating lens 14 may be installed at a distance of P/5 from the focal point (f). By installing a projection system in this way, the structure of an optical system can be made more compact.

A spatial filter 5 for controlling the etendue of an optical system is installed between the light source 10 and the collimating lens 14. Etendue denotes an optical conservation quantity in an optical system. The spatial filter 5 is preferably, but not necessarily, installed at the focal point (f) of the reflection mirror 13. The spatial filter 5 has a slit whose width is controllable. The sizes of color bars formed on the light valve 40 depend on the width of the slit.

The color separator 15 separates the light emitted from the light source 10 into three color beams, namely R, G, and B beams. The color separator 15 is constructed with first, second, and third dichroic filters 15a, 15b, and 15c disposed aslant at different angles with respect to an incident light axis. The color separator 15 separates incident light according to a predetermined wavelength range and advances the separated light beams at different angles. For example, the first dichroic filter 15a reflects a beam in the wavelength range, R, from white incident light and, at the same time, transmits beams in the green and blue wavelength ranges. G and B. The second dichroic filter 15b reflects the G beam from the beams transmitted by the first dichroic filter 15a and, at the same time, transmits the B beam. The third dichroic filter 15c reflects the B beam transmitted by the first and second dichroic filters 15a and 15b. The third dichroic filter 15c may be replaced with a total reflection mirror.

The R, G, and B beams, into which incident light has been separated according to wavelength by the first, second, and third dichroic filters 15a, 15b, and 15c, are reflected at different angles. In one non-limiting example, the R and B beams are focused on the same location as the G beam and then made incident upon the scrolling unit 20.

The scrolling unit 20 includes at least one lens cell through which light passes and scrolls the light separated by the color separator 15. The scrolling unit 20 scrolls incident color beams by converting the rotation of the lens cell into a rectilinear motion of an area of the lens cell through which light passes. This scrolling will be described later in greater detail.

As described above with reference to FIG. 4, the scrolling unit 20 is formed by spirally arranging at least one lens cell 22 on the outer circumferential surface of the column-like plate 21. The column-like plate 21 may be of a drum shape or of various polyprism shapes.

The scrolling unit 20 is rotatable about a predetermined axis. The rotation of the scrolling unit 20 is converted into a rectilinear motion of the cylinder lens array corresponding to the area through which light passes so that color scrolling is achieved. The lens cells 22 are arranged on the outer circumferential surface of the column-like plate 21 at an identical inclination. The interval of a rectilinear motion of the cylinder lens array depends on the width (w) and inclination of each of the lens cells 22. The interval of a rectilinear motion of the cylinder lens array is associated with the speed of the color scrolling.

A first cylindrical lens 16 is disposed between the color separator 15 and the scrolling unit 20. A first fly-eye lens array 34, a second cylindrical lens 17, and a second fly-eye lens array 35 are sequentially disposed in a light path between the scrolling unit 20 and the light valve 40. Although the second cylindrical lens 17 is disposed between the first and second fly-eye lens arrays 34 and 35 in FIGS. 8A and 8B, it may be disposed in front of the first fly-eye lens array 34.

A relay lens 38 is installed in a light path between the second fly-eye lens array 35 and the light valve 40.

The first cylindrical lens 16 reduces the width of a light beam incident upon the scrolling unit 20, and the second cylindrical lens 17 returns the width of the light beam transmitted by the scrolling unit 20 to its original width.

Figure 8B:
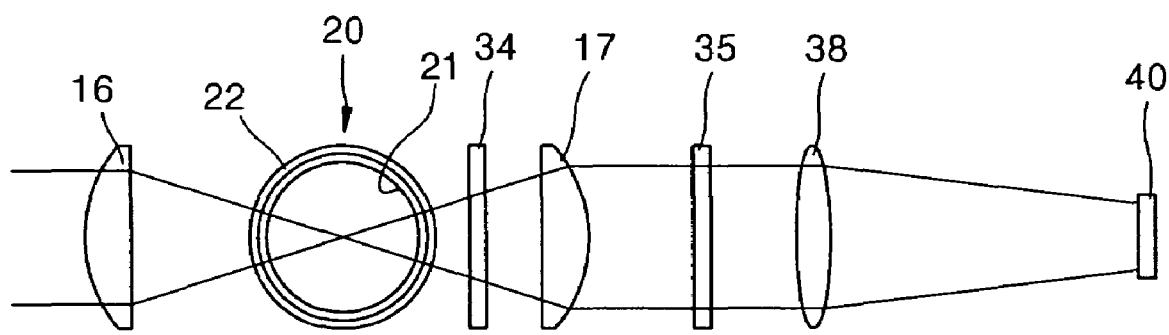
FIG. 8B is a top view of a part of the projection system of FIG. 8A.

An illustrative, non-limiting operation of the projection system of FIG. 8A having the above-described configuration will now be described. First, white light emitted from the light source 10 is incident upon the color separator 15 via the spatial filter 5 and the collimating lens 14. Next, the white light incident upon the color separator 15 is separated into at least two color beams, for example, R, G, and B color beams by the first, second, and third dichroic filters 15a, 15b, and 15c, and the R, G, and B color beams are incident upon the scrolling unit 20. The width of the light transmitted by the first, second, and third dichroic filters 15a, 15b, and 15c is reduced by the first cylindrical lens 16 as shown in FIG. 8B, and the light with a reduced with is then incident upon the scrolling unit 20. More specifically, the light passed through the first cylindrical lens 16 is focused at a center of the scrolling unit 20. Hence, light incident upon the second surface 20b has the same width as that of light reduced by the first cylindrical lens 16 and landing upon the first surface 20a.

Figure 9A:
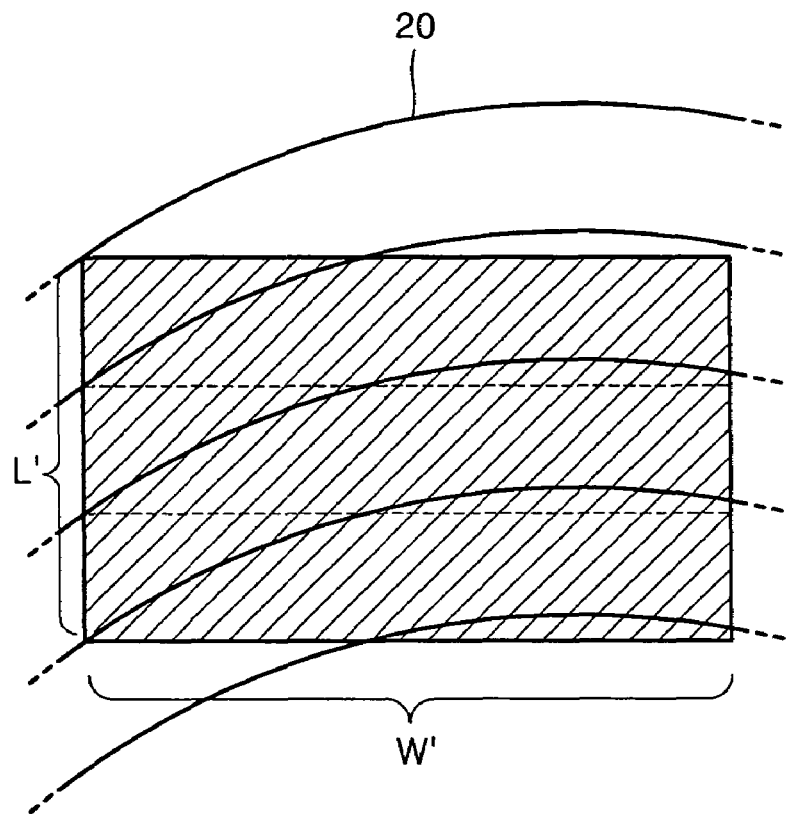
FIG. 9A shows the shape of a beam on the scrolling unit of FIG. 4 when no cylindrical lenses are used in the projection system of FIG. 8A.
Figure 9B:
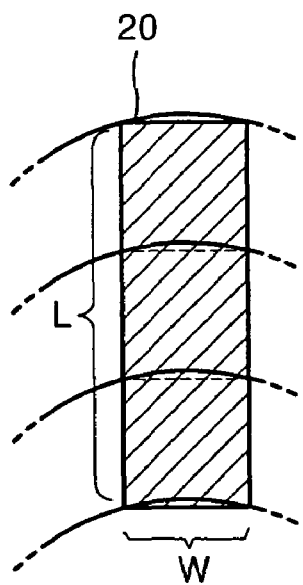
FIG. 9B shows the shape of a beam on the scrolling unit of FIG. 4 when a first cylindrical lens is used in the projection system of FIG. 8A.

FIG. 9A shows the cross-section of a beam L' emitted from the light source 10 and incident on the scrolling unit 20 without passing through the first cylindrical lens 16. Beam L' has a width W'. FIG. 9B shows the cross-section of a beam L that has a width W reduced by the first cylindrical lens 16 and which is then incident upon the scrolling unit 20. When a beam passing through the scrolling unit 20 is relatively wide, that is, in the case of the beam L', the curved shape of the spiral lens array does not match with the shape of the beam L', and thus there is light loss over an unmatched area for each color. To minimize the light loss, the first cylindrical lens 16 is included so that the beam L with a reduced width W is produced as shown in FIG. 9B. The shape of the spiral lens array, as shown in FIG. 9B, aligns more closely with that of the beam L.

Referring back to FIG. 8A, the light passing through the scrolling unit 20 is collimated by the second cylindrical lens 17 so that the width of the light previously reduced by the first cylindrical lens 16 is returned to the original width.

The R, G, and B beams obtained by the color separator 15 and traveling at different angles with respect to the incident light axis are each divided into a plurality of beams by each of the lens cells 22 while passing through the first surface 20a of the scrolling unit 20. The separated R, G, and B beams are focused on the second surface 20b, which may be opposite to the first surface 20a.

Next, R, G, and B beams transmitted through the scrolling unit 20 land on the first fly-eye lens array 34 such that they are arrayed on each of lens cells 34a. R, G, and B beams transmitted through the first fly-eye lens array 34 are collimated by the second cylindrical lens 17. Thereafter, the collimated R, G, and B beams are focused on corresponding color areas of the light valve 40 via the second fly-eye lens array 35 and the relay lens 38, thereby forming color bars.

Due to its drum shape, light passes through the first and second surfaces 20a and 20b of the scrolling unit 20 and an effect where light passes through two lens arrays is obtained. As the scrolling unit 20 rotates, a lens array, defined by the area of the scrolling unit 20 through which light passes, moves rectilinearly. Hence, the color bars formed on the light valve 40 are scrolled.

The scrolling of color bars by the scrolling unit 20 will now be described with exemplary reference to FIGS. 10A through 10C.

Figure 10A:
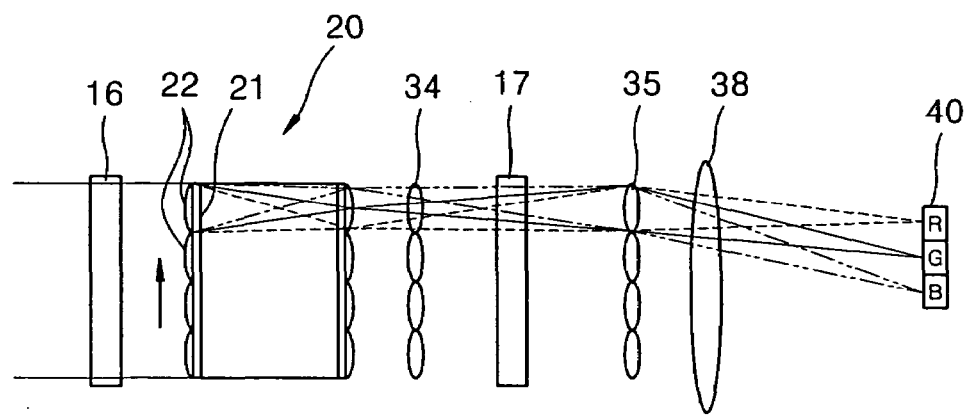
FIG. 10A through 10C show the scrolling operation of the projection system of FIG. 8A.
Figure 10B:
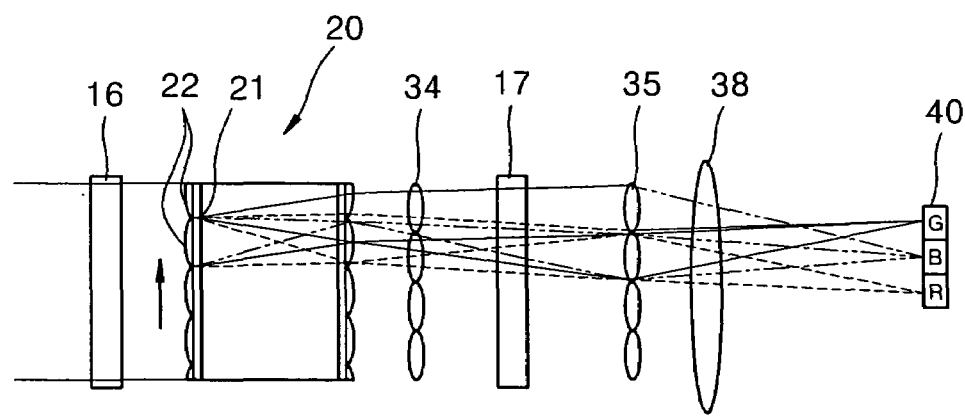
Figure 10C:
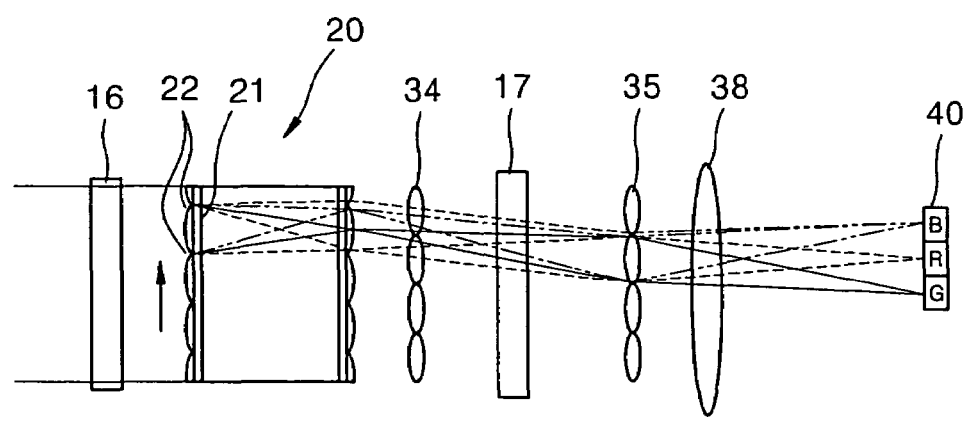

As shown in FIG. 10A, the R, G, and B beams obtained by the color separator 15 are incident upon each of the lens cells 22 corresponding to the first surface 20a of the scrolling unit 20 and then propagate to the second surface 20b thereof. Thereafter, the R, G, and B beams are focused on corresponding color areas of the light valve 40 via the first and second fly-eye lens arrays 34 and 35 and the relay lens 38. Hence, R, G, and B color bars are formed on the light valve 40. The second cylindrical lens 17 returns the width of light previously reduced by the first cylindrical lens 16 to the original width.

First, light passes through the scrolling unit 20, the first and second fly-eye lens arrays 34 and 35, and the relay lens 38 and forms color bars on the light valve 40, for example, in an R, G, and B order. Next, as the scrolling unit 20 rotates, the lens array defined by the area of the scrolling unit 20 through which light passes gradually moves upward or downward. Accordingly, the focal points of the color beams passing through the scrolling unit 20 vary as the scrolling unit 20 moves, and color bars in a G, B, and R order as shown in FIG. 10B are formed. Then, as the scrolling unit 20 rotates so that the incident color beams are scrolled, color bars in a B, R, and G order as shown in FIG. 10C are formed. Such scrolling is periodically repeated as the scrolling unit 20 rotates.

Figure 11:
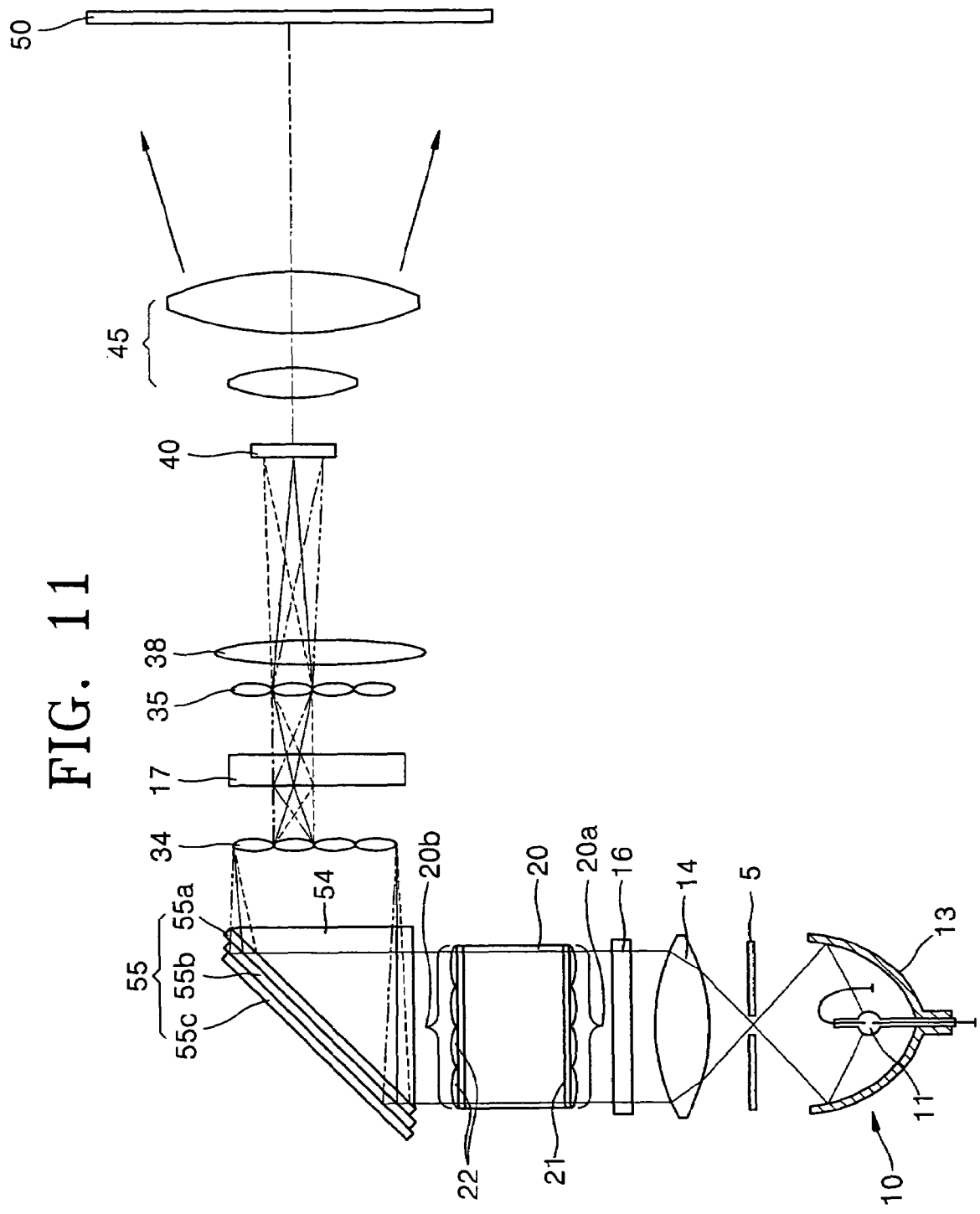
FIG. 11 is a schematic diagram of a modified example of the projection system of FIG. 8A.

FIG. 11 is a schematic diagram of a modified non-limiting example of the projection system of FIG. 8A. Referring to FIG. 11, a projection system comprises a color separator 55, which includes first, second, and third dichroic filters 55a, 55b, and 55c for transmitting or reflecting incident light according to color. The first, second, and third dichroic filters 55a, 55b, and 55c are disposed parallel to one another.

The projection system of FIG. 11 includes a light source 10, a spatial filter 5, a scrolling unit 20, and the color separator 55, which are sequentially arranged. The spatial filter 5 is disposed at a focal plane of light emitted from the light source 10 and controls the divergence angle (or etendue) of incident light. The scrolling unit 20 divides light transmitted through the spatial filter 5 into a plurality of beams and scrolls the beams so that they are focused on different locations of the light valve 40. The color separator 55 is disposed behind the scrolling unit 20.

The first cylindrical lens 16 for reducing the width of a light beam incident upon the scrolling unit 20 is installed in front of the scrolling unit 20. The first fly-eye lens array 34, the second cylindrical lens 17, the second fly-eye lens array 35, and the relay lens 38 are sequentially disposed in a light path between the color separator 55 and the light valve 40. The positions of the first fly-eye lens array 34 and second cylindrical lens 17 may be switched.

The light beams incident on the scrolling unit 20 pass at different angles through different areas of a cylindrical lens cell 22. The light beams are incident upon the color separator 55 and separated into beams of different colors by the first, second, and third dichroic filters 55a, 55b, and 55c. Finally, the separated light beams are advanced at different angles. Also, in contrast with the projection system of FIG. 8A, a prism 54 is additionally included between the scrolling unit 20 and the color separator 55 so as to transfer an incident light to the color separator 55 without changing the path of the light.

Since the second cylindrical lens 17, the first and second fly-eye lens arrays 34 and 35, and the relay lens 38 have already been described above, they will not be described again here in detail.

Figure 12A:
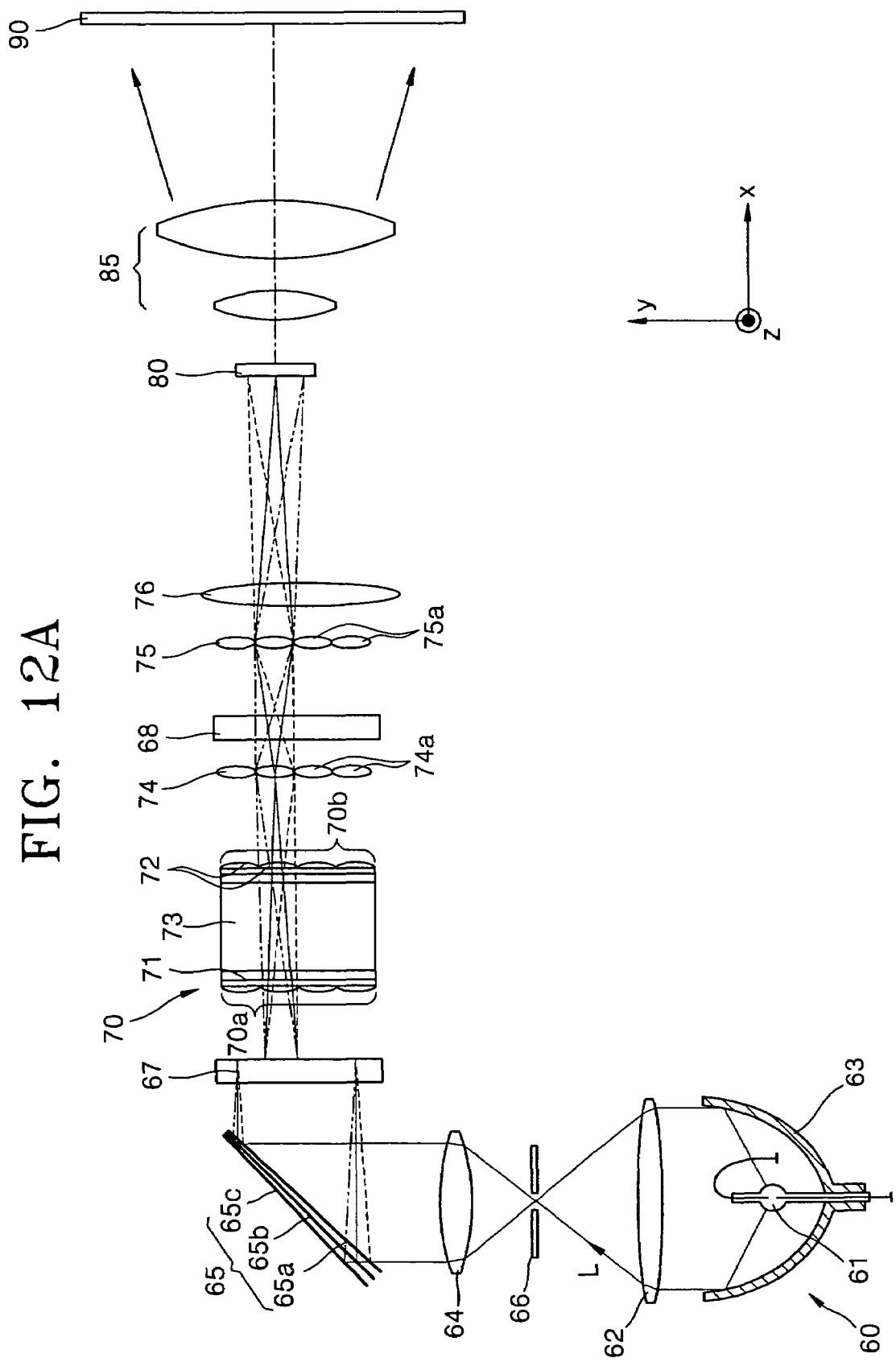
FIG. 12A is a schematic diagram of a projection system according to another embodiment of the present invention.
Figure 12B:
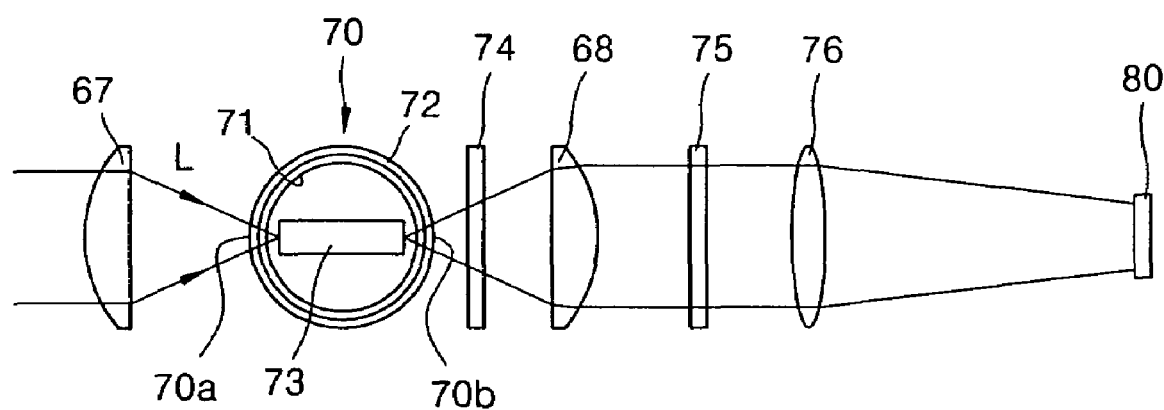
FIG. 12B is a top view of a part of the projection system of FIG. 12A.
Figure 12B:
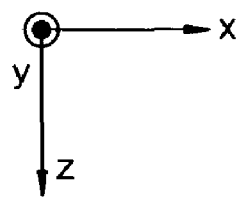

Referring to FIGS. 12A and 12B, a projection system according to another embodiment of the present invention includes a light source 60, a color separator 65, a scrolling unit 70, a light valve 80, and a projection lens unit 85. The color separator 65 separates light emitted from the light source 60 according to color. The scrolling unit 70 scrolls a plurality of color beams transmitted by the color separator 65. The light valve 80 processes the beams scrolled by the scrolling unit 70 according to an image signal and forms a picture. The projection lens unit 85 magnifies the picture formed by the light valve 80 and projects the magnified picture onto a screen 90.

The light source 60 emits white light and includes a lamp 61, for generating light, and a reflection mirror 63, for reflecting light emitted from the lamp 61 and for guiding the path of the reflected light. The reflection mirror 63 may be a parabolic mirror which uses the lamp 61 as a focal point and which collimates light beams emitted from the lamp 61. Alternatively, the reflection mirror 63 may be an elliptical mirror whose first focal point is the position of the lamp 61 and whose second focal point is a point where light is focused. Because a parabolic mirror is used as the reflection mirror 63, a first focusing lens 62 for focusing light emitted from the lamp 61 is also included.

A spatial filter 66 for controlling the divergence angle (or etendue) of light emitted from the light source 60 and a second focusing lens 64 for collimating light passed through the spatial filter 66 are installed between the light source 60 and the color separator 65.

The color separator 65 comprises a first, second, and third dichroic filters 65a, 65b, and 65c disposed aslant at different angles with respect to an incident light axis. The color separator 65 separates incident light according to a predetermined wavelength range and advances the separated light beams at different angles. For example, the first dichroic filter 65a reflects a beam in the wavelength range, R, from white incident light and, at the same time, transmits beams in the green and blue wavelength ranges, G and B. The second dichroic filter 65b reflects the G beam from the beams transmitted by the first dichroic filter 65a and, at the same time, transmits the B beam. The third dichroic filter 65c reflects the B beam transmitted by the first and second dichroic filters 65a and 65b. The third dichroic filter 65c may be replaced with a total reflection mirror.

The R, G, and B beams, into which incident light has been separated according to wavelength by the first, second, and third dichroic filters 65a, 65b, and 65c, are reflected at different angles. In one non-limiting example, the R and B beams are focused on the same location as the G beam and then made incident upon the scrolling unit 70.

The scrolling unit 70 is formed by spirally arranging at least one lens cell 72 on an outer circumferential surface of a column-like plate 71. A light guide plate 73 is installed within the column-like plate 71. Preferably, but not necessarily, the lens cells 72 are cylindrical and are arranged at an identical inclination.

The column-like plate 71 may be of a drum shape or of various polyprism shapes. The scrolling unit 70 is rotatable. Similar to that described above with reference to FIG. 5A, the rotation of the scrolling unit 70 simulates a rectilinear motion (which is in direction indicated by arrow B) of the lens cells 72 as viewed from the area A through which the light L passes so that color scrolling is achieved.

The scrolling unit 70 has a first surface 70a, through which the light L enters, and a second surface 70b, through which the light L goes out. The light guide plate 73 is disposed between the first and second surfaces 70a and 70b of the scrolling unit 70 and guides light passing through the first surface 70a so that light is uniformly distributed in a predetermined direction. Preferably, but not necessarily, the light guide plate 73 guides the light L in direction z, which is perpendicular to the direction of the rectilinear motion of the lens array of the scrolling unit 70 (direction y) and to the direction in which light advances (direction x).

A first cylindrical lens 67 is disposed between the color separator 65 and the scrolling unit 70 and reduces the width of a light beam incident upon the scrolling unit 70. A first cylinder lens array 74, a second cylindrical lens 68, a second cylinder lens array 75, and a relay lens 76 are sequentially disposed in a light path between the scrolling unit 70 and the light valve 80. The locations of the first cylinder lens array 74 and second cylindrical lens 68 may be switched.

Referring to FIG. 12B, the light guide plate 73 guides the light L in direction z, which is perpendicular to a color separation direction, y, (or a scrolling direction) and to the direction in which light advances (direction x). Since the light guide plate 73 guides incident light in direction z, the light is uniformly distributed in direction z. However, since the light guiding by the light guide plate 73 is not performed in the color separation direction, y, (or the scrolling direction), color beams separated by each of the lens cells 72 while passing through the first surface 70*a* of the scrolling unit 70 are transferred to the second surface 70*b* without being changed.

The first and second cylinder lens arrays 74 and 75 are formed by aligning a plurality of cylinder lens cells 74*a* and a plurality of cylinder lens cells 75*a*, respectively. Preferably, but not necessarily, an alignment direction (indicated by y) of the cylinder lens cells 74*a* and 75*a* is perpendicular to the direction in which the light guide plate 73 guides light (direction z). Light guided in one direction by the light guide plate 73 is transferred to the first cylinder lens array 74 so that an array of R, G, and B color beams is formed on each of the lens cells 74*a* of the first cylinder lens array 74. The R, G, and B beams are transferred from the first cylinder lens array 74 to the second cylinder lens array 75, pass through the relay lens 76, and are focused on corresponding color areas of the light valve 80. Hence, R, G, and B color bars are formed on the light valve 80. The second cylindrical lens 68 collimates light converged by the first cylindrical lens 67.

The R, G, and B color bars are periodically scrolled with a rotation of the scrolling unit 70, thereby forming a color image which is magnified by projection lens unit 85 and projected onto a screen 90. The scrolling performed by the scrolling unit 70 is the same as described above with reference to FIGS. 10A through 10C.

Figure 13:
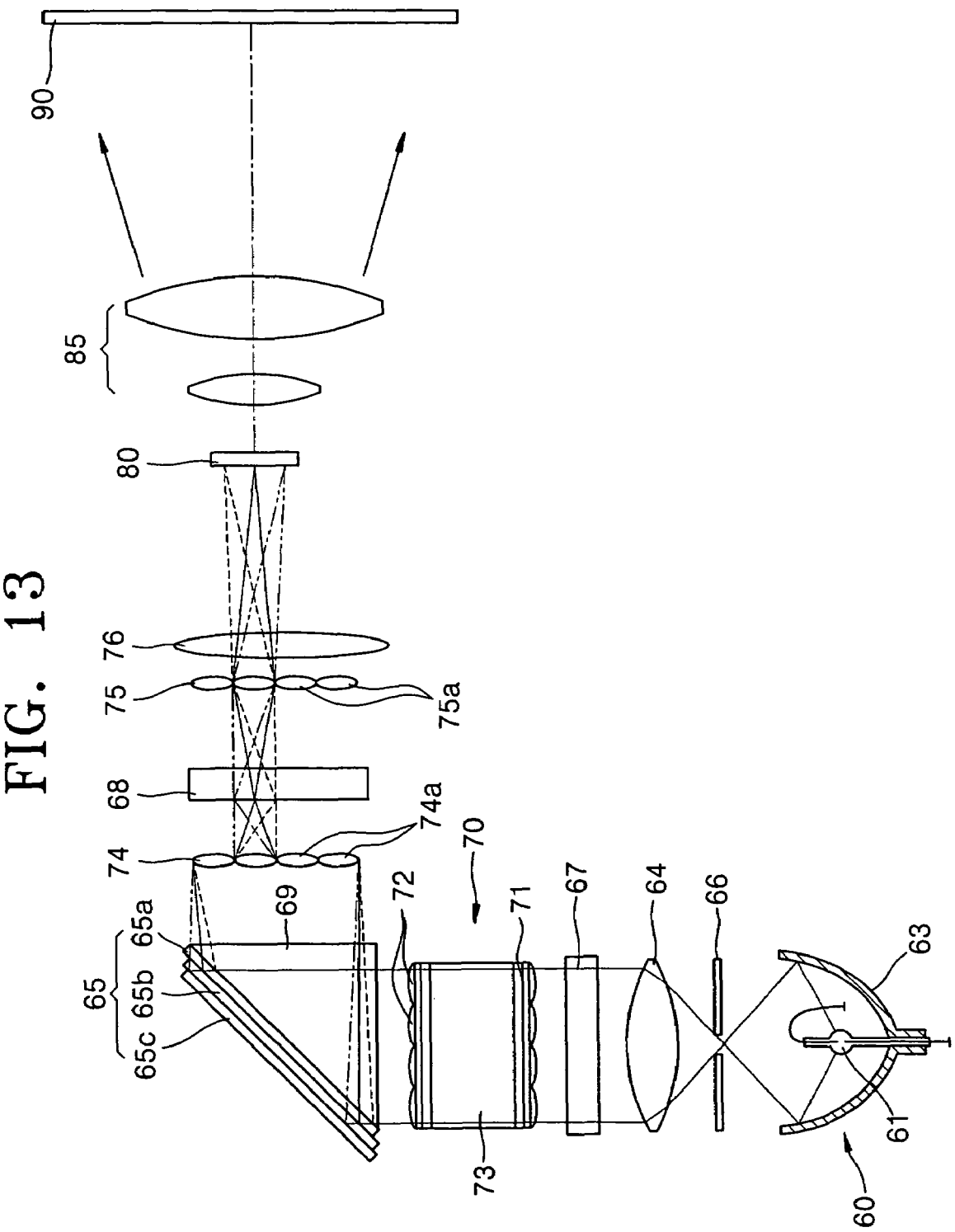
FIG. 13 is a schematic diagram of a modified example of the projection system of FIG. 12A.

Referring to FIG. 13, in a modified example of the projection system of FIG. 12A, the first, second, and third dichroic filters 65*a*, 65*b*, and 65*c* of the color separator 65 are disposed parallel to one another. Since elements indicated by like reference numerals in FIGS. 12A and 13 perform the same functions, they will not be described again in detail.

In the projection system of FIG. 13, the scrolling unit 70 is disposed between a light source 60 and a color separator 65. A first cylindrical lens 67 is disposed in front of the scrolling unit 70 and increases light efficiency by reducing the width of a light beam incident upon the scrolling unit 70. A prism 69 is further installed in a light path between the scrolling 70 and the color separator 65.

Figure 14A:
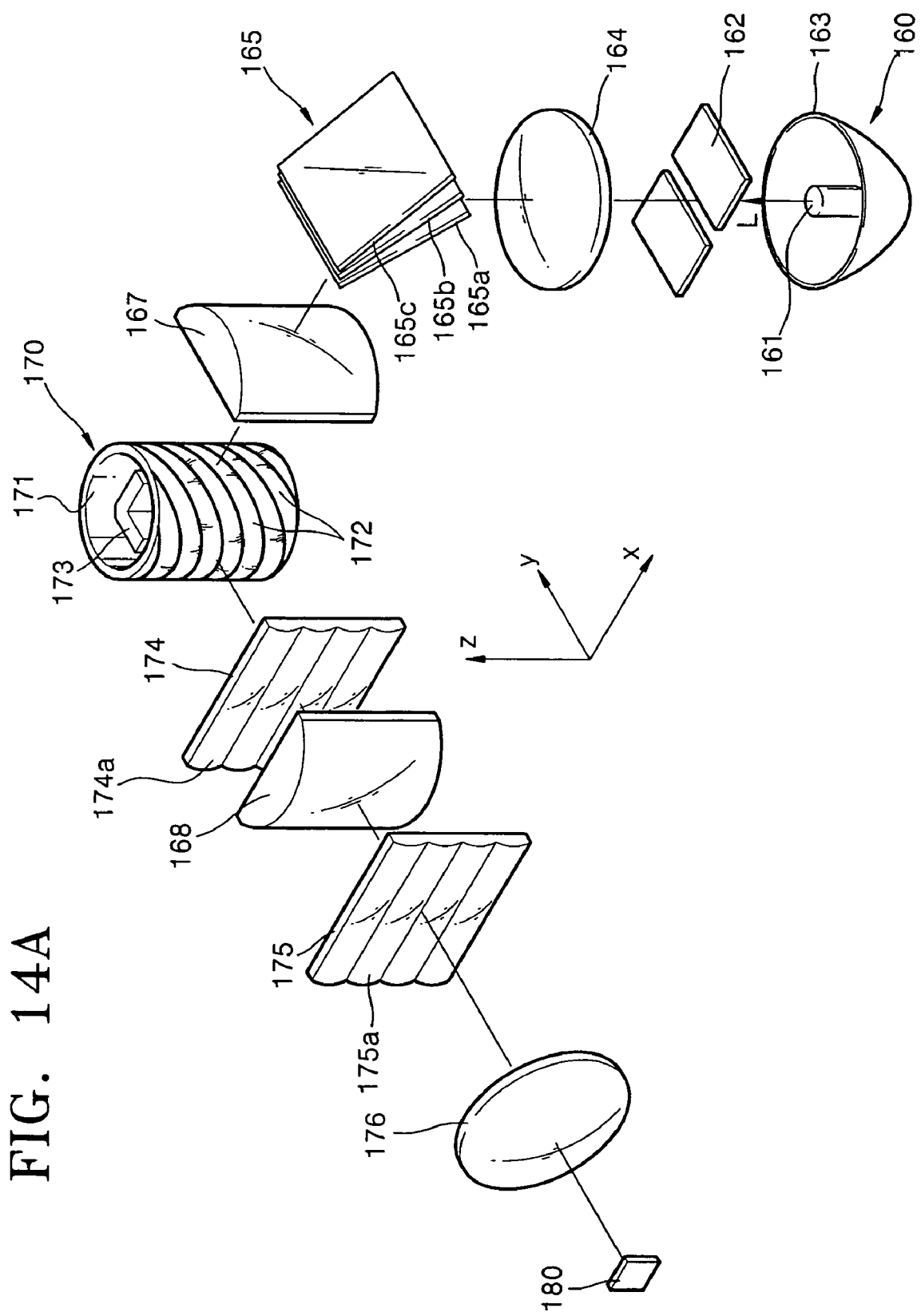
FIG. 14A is a perspective view schematically showing an arrangement of a projection system according to still another embodiment of the present invention.
Figure 14B:
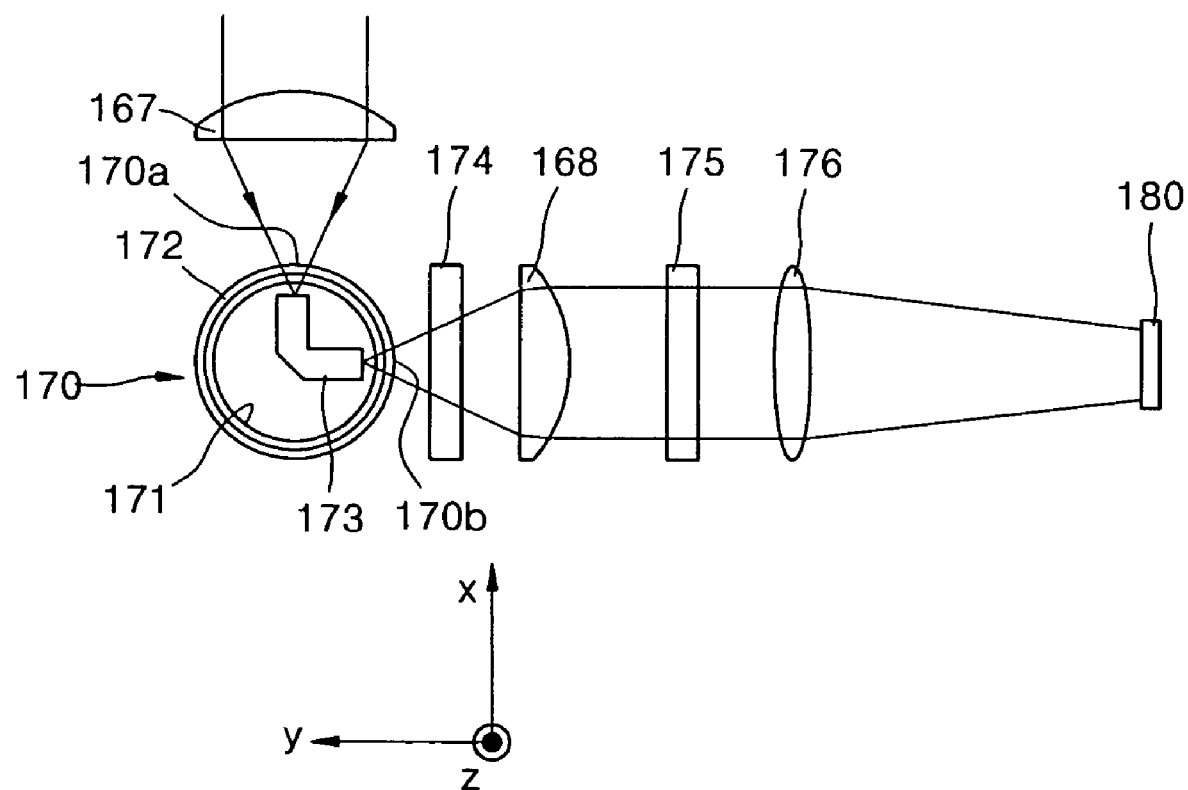
FIG. 14B is a top view of a part of the projection system of FIG. 14A.

As shown in FIGS. 14A and 14B, a projection system consistent with another embodiment of the present invention includes a light source 160, a color separator 165, a scrolling unit 170, a light path changer 173, a light valve 180, and a projection lens unit (not shown). The color separator 165 separates light emitted from the light source 160 according to color. The scrolling unit 170 scrolls a plurality of color beams transmitted by the color separator 165. The light path changer 173 is installed within the scrolling unit 170 and changes the traveling path of incident light. The light valve 180 processes the color beams scrolled by the scrolling unit 170 according to an image signal and forms a picture. The projection lens unit (not shown) magnifies the picture formed by the light valve 180 and projects the magnified picture onto a screen (not shown).

The light source 160 emits white light and includes a lamp 161, for generating light, and a reflection mirror 163, for reflecting light emitted from the lamp 161 and for guiding the path of the reflected light. The reflection mirror 163 may be a parabolic mirror or an elliptical mirror. The reflection mirror 163 of FIG. 14A is an elliptical mirror.

A spatial filter 162, which controls the divergence angle (or etendue) of light emitted from the light source 160, and a collimating lens 164, which collimates light diverged by the spatial filter 162, are installed between the light source 160 and the color separator 165.

The color separator 165 is constructed with first, second, and third dichroic filters 165*a*, 165*b*, and 165*c* disposed aslant at different angles with respect to an incident light axis. The color separator 165 separates incident light according to a predetermined wavelength range and advances the separated light beams at different angles. For example, the first dichroic filter 165*a* reflects a beam in the wavelength range, R, from white incident light and, at the same time, transmits beams in the green and blue wavelength ranges, G and B. The second dichroic filter 165*b* reflects the G beam from the beams transmitted by the first dichroic filter 165*a* and, at the same time, transmits the B beam. The third dichroic filter 165*c* reflects the B beam transmitted by the first and second dichroic filters 165*a* and 165*b*. The third dichroic filter 165*c* may be replaced with a total reflection mirror.

The R, G, and B beams, into which incident light has been separated according to wavelength by the first, second, and third dichroic filters 165*a*, 165*b*, and 165*c*, are reflected at different angles. In one non-limiting example, the R and B beams are focused on the same location as the G beam and then made incident upon the scrolling unit 170.

The scrolling unit 170 is formed by spirally arranging at least one lens cell 172 on an outer circumferential surface of a column-like plate 171. Preferably, but not necessarily, the lens cells 172 are cylindrical.

The column-like plate 171 may be of a drum shape or of various polyprism shapes. The scrolling unit 170 is rotatable. Similar to that described above with reference to FIG. 5A, the rotation of the scrolling unit 170 simulates a rectilinear motion (which is in direction indicated by arrow B) of the lens cells 172 as viewed from the area A through which the light L passes so that color scrolling is achieved.

A light path changer 173 is disposed within the scrolling unit 170 to change the path of light received through the scrolling unit 170. The light path changer 173 may be a light guide plate which is curved at a predetermined angle (θ). Alternatively, the light path changer 173 may be a mirror which is inclined at a predetermined angle with respect to the axis of light received through the scrolling unit 170. Since the light path changer 173 is curved at the predetermined angle (θ), an area of the scrolling unit 20 through which light goes out can be changed. The scrolling unit 170 has a first surface 170*a*, through which the light L enters, and a second surface 170*b*, through which the light L goes out. The second surface 170*b* is determined depending on the curved shape of the light path changer 173. Light incident upon the scrolling unit 170 through the first surface 170*a* is guided by the light path changer 173 toward the second surface 170*b*.

Preferably, but not necessarily, the second surface 170*b* includes lens cells that are arranged the same as or similar to the lens array of the first surface 170*a*.

The light path changer 173 changes the path of light incident upon the scrolling unit 170 and guides light passed through the first surface 170*a* so that the light is uniformly distributed in a predetermined direction. Referring to FIG. 14B, the light path changer 173 guides light in a direction which is perpendicular to the direction in which the lens array of the scrolling unit 170 rectilinearly moves (i.e., a color separation direction or a scrolling direction) and to a direction in which light advances. Since light is guided only in one direction while passing through the light path changer 173, it is uniformly distributed in the direction. However, since light guiding by the light path changer 173 is not performed in the color separation direction (or the scrolling direction), color beams separated by each of the lens cells 172 while passing through the first surface 170a of the scrolling unit 170 are transferred to the second surface 170b without being changed.

A first cylindrical lens 167 is disposed in a light path between the color separator 165 and the scrolling unit 170 and reduces the width of a light beam incident upon the scrolling unit 170. A first cylinder lens array 174, a second cylindrical lens 168, a second cylinder lens array 175, and a relay lens 176 are sequentially disposed on a light path between the scrolling unit 170 and the light valve 180. The locations of the first cylinder lens array 174 and second cylindrical lens 168 may be switched.

The first and second cylinder lens arrays 174 and 175 are formed by aligning a plurality of cylinder lens cells 174a and a plurality of cylinder lens cells 175a, respectively. Preferably, but not necessarily, an alignment direction (indicated by z) of the cylinder lens cells 174a and 175a is perpendicular to the direction in which the light path changer 173 guides light. Light guided in one direction by the light path changer 173 is transferred to the first cylinder lens array 174 so that an array of R, G, and B color beams is formed on each of the lens cells 174a. The R, G, and B beams are transferred from the first cylinder lens array 174 to the second cylinder lens array 175, pass through the relay lens 176, and are focused on corresponding color areas of the light valve 180. Hence, R, G, and B color bars are formed on the light valve 180. The second cylindrical lens 168 collimates light converged by the first cylindrical lens 167.

The R, G, and B color bars are periodically scrolled with a rotation of the scrolling unit 170, thereby forming a color image. The scrolling performed by the scrolling unit 170 is the same as described above with reference to FIGS. 10A through 10C.

Figure 15:
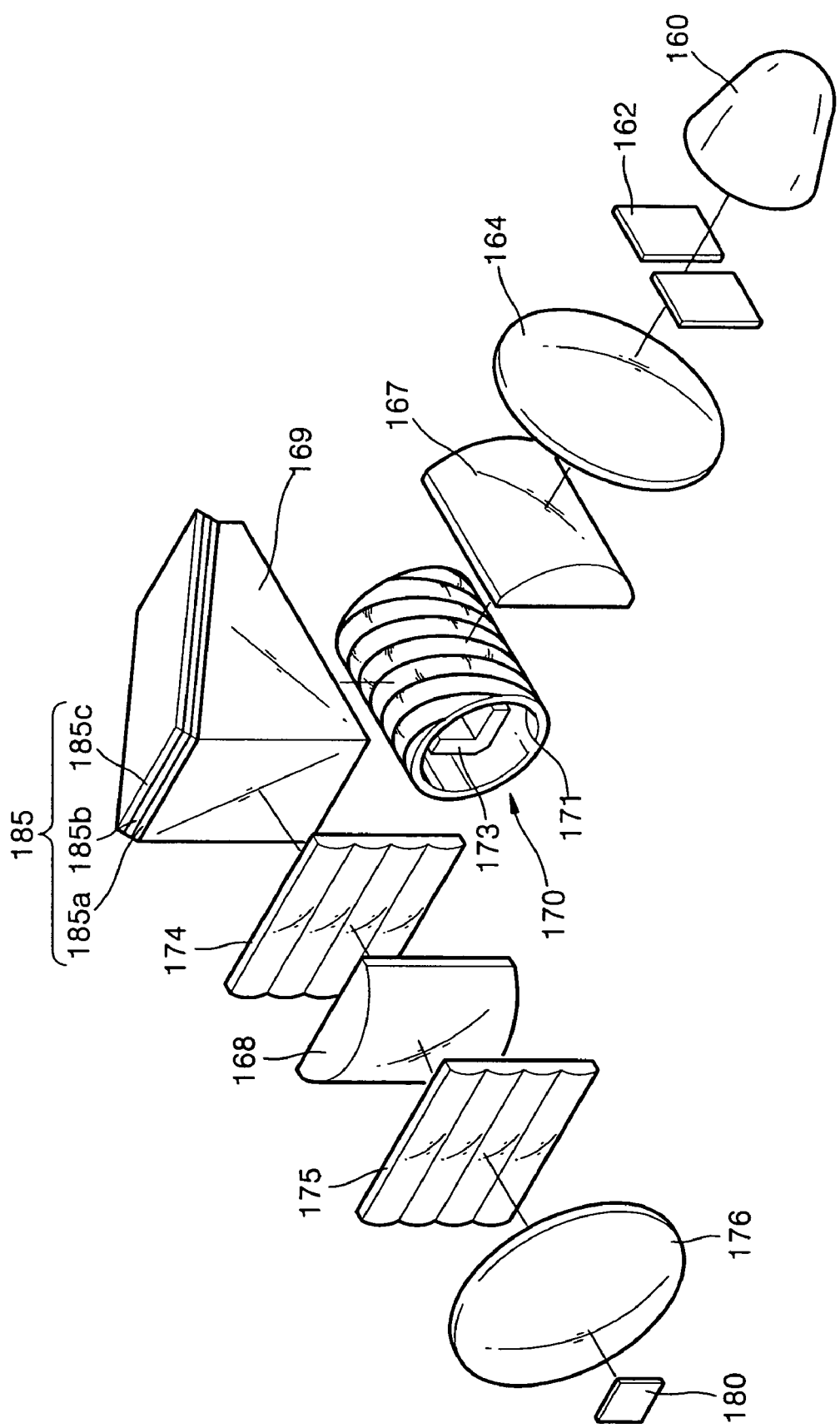
FIG. 15 is a schematic diagram of a modified example of the projection system of FIG. 14A.

Referring to FIG. 15, a modified example of the projection system of FIG. 14A includes a color separator 185, which includes first, second, and third dichroic filters 185a, 185b, and 185c for transmitting or reflecting incident light according to color. The first, second, and third dichroic filters 185a, 185b, and 185c are disposed parallel to one another. Since elements indicated by like reference numerals in FIGS. 14A and 15 perform the same functions, they will not be described again in detail.

In the projection system of FIG. 15, the scrolling unit 170 is disposed between the light source 160 and the color separator 185. A first cylindrical lens 167 is disposed in front of the scrolling unit 170 and increases light efficiency by reducing the width of a light beam incident upon the scrolling unit 170. A prism 169 is further installed in a light path between the scrolling 170 and the color separator 185.

A plurality of color beams obtained by the color separator 185 are incident upon corresponding color areas of the light valve 180 via the first and second cylinder lens arrays 174 and 175 and the relay lens 176, thereby forming color bars. The color bars are scrolled with a rotation of the scrolling unit 170, thereby forming a color image.

In a projection system consistent with the present invention, a single scrolling unit scrolls a plurality of color beams which travel along a single path. Thus, the color beams can be controlled to have an identical speed.

Also, since the scrolling unit is formed by spirally arranging at least one lens cell on an outer circumferential surface of a drum- or polyprism-like plate, a simple and small projection system can be obtained. Still further, since all color beams are scrolled using a single scrolling unit at an identical speed, the synchronization of the color bars according to an image signal is easily controlled. Consequently, the quality of an image can be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A scrolling unit for scrolling incident light, comprising:
   a plurality of lens cells arranged on the outer circumferential surface of a column-like plate at identical inclinations with respect to a rotational axis of the scrolling unit;
   wherein the plurality of lens cells separate the incident light into a plurality of beams; and
   wherein a rotation of the scrolling unit about the rotational axis simulates a rectilinear motion of a lens array defined by an area of the scrolling unit through which light passes.

2. The scrolling unit of claim 1, wherein the column-like plate is of a drum shape.

3. A scrolling unit for scrolling incident light, in which at least one lens cell which separates the incident light into a plurality of beams is spirally arranged on an outer circumferential surface of a column-like plate,
   wherein a rotation of the scrolling unit about a predetermined rotating axis simulates a rectilinear motion of a lens array defined by an area of the scrolling unit through which light passes, and
   wherein a light guide plate is included between first and second surfaces of the scrolling unit through which the incident light passes.

4. A scrolling unit for scrolling incident light, in which at least one lens cell which separates the incident light into a plurality of beams is spirally arranged on an outer circumferential surface of a column-like plate,
   wherein a rotation of the scrolling unit about a predetermined rotating axis simulates a rectilinear motion of a lens array defined by an area of the scrolling unit through which light passes, and
   wherein a curved light guide plate is installed within the scrolling unit.

5. A projection system comprising:
   a light source;
   a color separator which separates light emitted from the light source according to color;
   a scrolling unit, comprising:
      a plurality of lens cells arranged on an outer circumferential surface of a column-like plate at identical inclinations with respect to a rotational axis of the scrolling unit,
      wherein the plurality of lens cells scroll incident light upon the rotation of the scrolling unit about the rotational axis to simulate a rectilinear motion of a lens array defined by an area of the scrolling unit through which light passes; and
   a light valve on which a plurality of color beams transmitted by the color separator are incident via the scrolling unit and which processes the color beams according to an input image signal to form a color image.

6. The projection system of claim 5, wherein the color separator includes first, second, and third dichroic filters inclined adjacent to one another at different angles and transmitting or reflecting the incident light according to color, and the scrolling unit is disposed in a light path downstream of the color separator.

7. The projection system of claim 5, wherein a spatial filter for controlling the divergence angle of light emitted from the light source is disposed in a light path between the light source and the color separator.

8. A projection system comprising:
a light source;
a color separator which separates light emitted from the light source according to color;
a scrolling unit which is formed by spirally arranging at least one lens cell on an outer circumferential surface of a column-like plate and which scrolls incident light upon rotation to simulate a rectilinear motion of a lens array defined by an area of the scrolling unit through which light passes; and
a light valve on which a plurality of color beams transmitted by the color separator are incident via the scrolling unit and which processes the color beams according to an input image signal to form a color image;
wherein the color separator includes first, second, and third dichroic filters inclined adjacent and parallel to one another and transmitting or reflecting the incident light according to color, and wherein the scrolling unit is disposed in a light path upstream of the color separator.

9. A projection system comprising:
a light source;
a color separator which separates light emitted from the light source according to color;
a scrolling unit which is formed by spirally arranging at least one lens cell on an outer circumferential surface of a column-like plate and which scrolls incident light upon rotation to simulate a rectilinear motion of a lens array defined by an area of the scrolling unit through which light passes; and
a light valve on which a plurality of color beams transmitted by the color separator are incident via the scrolling unit and which processes the color beams according to an input image signal to form a color image;
wherein first and second fly-eye lens arrays are disposed in a light path between the color separator and the light valve.

10. The projection system of claim 9, wherein a first cylindrical lens for reducing the width of a light beam incident upon the scrolling unit is disposed in front of the scrolling unit, and a second cylindrical lens for collimating a light beam transmitted through the scrolling unit is disposed behind the scrolling unit.

11. The projection system of claim 9, wherein a relay lens is disposed in a light path between the second fly-eye lens array and the light valve.

12. The projection system of claim 9, wherein a spatial filter for controlling the divergence angle of light emitted from the light source is disposed in a light path between the light source and the color separator.

13. A projection system comprising:
a light source;
a color separator which separates light emitted from the light source according to color;
a scrolling unit which is formed by spirally arranging at least one lens cell on an outer circumferential surface of a column-like plate and which scrolls incident light upon rotation to simulate a rectilinear motion of a lens array defined by an area of the scrolling unit through which light passes;
a light guide plate which is disposed within the scrolling unit and guides light transmitted through the scrolling unit; and
a light valve on which a plurality of color beams obtained by the color separator are incident via the scrolling unit and the light guide plate and which processes the color beams according to an input image signal to form a color image.

14. The projection system of claim 13, wherein the color separator includes first, second, and third dichroic filters inclined adjacent to one another at different angles and transmitting or reflecting the incident light according to color, and the scrolling unit is disposed in a light path downstream of the color separator.

15. The projection system of claim 13, wherein the color separator includes
first, second, and third dichroic filters inclined adjacent and parallel to one another and transmitting or reflecting the incident light according to color, and the scrolling unit is disposed in a light path upstream of the color separator.

16. The projection system of claim 13, wherein first and second cylinder lens arrays have a plurality of cylinder lens cells arranged parallel to one another and are disposed in a light path between the color separator and the light valve.

17. The projection system of claim 16, wherein a direction in which the light guide plate guides light incident upon the scrolling unit is perpendicular to a direction in which the cylinder lens cells are arranged.

18. The projection system of claim 16, wherein a first cylindrical lens for reducing the width of a light beam incident upon the scrolling unit is disposed in front of the scrolling unit, and a second cylindrical lens for collimating a light beam transmitted through the scrolling unit is disposed behind the scrolling unit.

19. The projection system of claim 16, wherein a relay lens is disposed in a light path between the second cylinder lens array and the light valve.

20. The projection system of claim 16, wherein a spatial filter for controlling the divergence angle of light emitted from the light source is disposed on a light path between the light source and the color separator.

21. The projection system of claim 13, wherein the direction in which the light guide plate guides light incident upon the scrolling unit is perpendicular to a direction in which the scrolling unit scrolls light.

22. The projection system of claim 13, wherein a spatial filter for controlling the divergence angle of light emitted from the light source is disposed on a light path between the light source and the color separator.

23. The projection system of claim 13, wherein the light guide plate is curved at a predetermined angle.

24. The projection system of claim 23, wherein the angle is determined so that a lens array defined by an area of the scrolling unit through which light exits via the light guide plate has substantially the same shape of a lens array defined by an area of the scrolling unit through which the light enters.

25. The projection system of claim 13, wherein the at least one lens cell comprises a plurality of lens cells arranged at an identical inclination with respect to an axis of rotation of the column-like plate on the outer circumferential surface of the column-like plate.

26. The projection system of claim 13, wherein a color scrolling speed depends on a width of a lens cell and the inclination of the lens cell.

* * * * *